United States Patent [19]

Isono et al.

[11] Patent Number: 5,483,734
[45] Date of Patent: Jan. 16, 1996

[54] METHOD FOR PRODUCING THIN FILM MAGNETIC HEAD

[75] Inventors: Yukihiro Isono; Makoto Saito, both of Odawara; Kazuyoshi Adachi, Kanagawa; Masato Yumoto; Akio Takakura, both of Hiratsuka, all of Japan

[73] Assignee: Hitachi, Ltd., Tokyo, Japan

[21] Appl. No.: 118,489

[22] Filed: Sep. 8, 1993

[30] Foreign Application Priority Data

Sep. 11, 1992 [JP] Japan ................................ 4-243408

[51] Int. Cl.⁶ .................................................. G11B 5/42
[52] U.S. Cl. ........................................ 29/603; 29/593
[58] Field of Search ............................... 29/603, 593

[56] References Cited

U.S. PATENT DOCUMENTS 5,175,938  1/1993  Smith ........................... 29/603 X
5,361,547  11/1994  Church et al. ................ 29/603 X

FOREIGN PATENT DOCUMENTS 63-29315   2/1988  Japan.
3-272008   3/1991  Japan.

Primary Examiner—Carl E. Hall
Attorney, Agent, or Firm—Kenyon & Kenyon

[57] ABSTRACT

A lower magnetic film, a magnetic gap layer, a conductor coil, an insulating layer for electrically insulating the conductor coil, an upper magnetic film and a protective film are laminated on a substrate. Formation data of a lamination step are collected. An optimum value of a magnetic gap depth G of the magnetic gap layer is calculated on the basis of the formation data. The magnetic gap depth is machined to the optimum value on the basis of the optimum value so calculated.

6 Claims, 8 Drawing Sheets

PATTERN DISPOSITION POSITION go ··· REFERENCE GAP DEPTH $Y_0$ ··· REFRENCE Y DIMENSION

METHOD FOR PRODUCING THIN FILM MAGNETIC HEAD

BACKGROUND OF THE INVENTION

The present invention relates to a method of producing a thin film magnetic head. More particularly, it relates to a method of producing a thin film magnetic head that involves a machining step of a gap depth of a thin film magnetic head, providing eventually a magnetic head having stable electrical characteristics irrespective of variance inherent to individual heads that occurs during a production process.

Recently, electronic computers have come to possess information processing capacity comparable to that of large-scale computers of a generation ago. On the other hand, down-sizing has made a remarkable progress. With such a background, function of magnetic disk devices has drastically been improved so as to satisfy the demands for a smaller size and a greater capacity. For these reasons, so-called "thin film magnetic heads", which are produced by forming a ultra-fine magnetic head structure on a substrate by the application of photolithography technique, have gained a wider application to further improve a recording density.

To produce this thin film magnetic head, a large number of thin film magnetic conversion devices are formed in lot on a substrate and then head slider machining is carried out in a block unit having these thin film magnetic conversion device mounted thereto. In this way, the production cost per head can be reduced and a higher recording density can be accomplished.

In the thin film magnetic head of this kind, high density recording/reproduction performance is affected greatly by a gap depth which is the distance between a position of a distal end of an insulating layer (GO in later-appearing FIG. 2B) between upper and lower magnetic layers and a floating surface opposing a recording medium. Recently, dimensional accuracy almost approximate to the limit of machining technology for forming the gap depth has been required for the gap depth with an improvement in performance required for the thin film magnetic head. In other words, since a slight dimensional error greatly affects performance of the thin film magnetic head, the gap depth is the greatest factor for deteriorating the production yield of the thin film magnetic head, and solution of this problem is the most critical problem during the production of the thin film magnetic head.

FIG. 10 of the accompanying drawings illustrates appearance of a thin film magnetic head slider, and FIGS. 2A to 2C show a detailed structure of this thin film magnetic conversion device. As depicted in FIG. 10, a thin film magnetic conversion device 9 is generally mounted to a medium flow-out end of a head slider 1 made of a ceramic material. In this example, two thin film magnetic conversion devices are shown mounted to one slider. Reference numeral 9a denotes a lead wire and 9b denotes a terminal. As shown in detailed structural sectional views of FIGS. 2A to 2C, the thin film magnetic conversion device 9 includes a magnetic yoke comprising lower and upper magnetic layers 5 and 6 formed on a base layer 2, and a conductor coil 8, an insulating layer 7 and a magnetic gap film 3 that are formed inside the magnetic yoke. This structure is covered as a whole with a protective film 4 and is formed on a substrate (head slider) 1. The dimension of the gap depth is a distance G from a position of a distal end GO of the insulating layer 7 (a position at which the gap between the lower magnetic layer 5 and the upper magnetic layer 6 starts expanding) to a surface 1F which is an air lubrication floating surface to a magnetic recording medium. This dimension of the gap depth is a dimension inside the thin film magnetic conversion device, and cannot be inspected directly from outside. Incidentally, FIG. 2B is a sectional view of an induction type thin film magnetic head, and FIG. 2C is a sectional view of a composite type thin film magnetic head.

Machining of this gap depth is carried out in the following way. First of all, the substrate 1 on which a large number of thin film magnetic conversion devices are formed as shown in FIG. 3 is cut into blocks 1B in a unit of a plurality (generally, a dozen to 20 or 30) of thin film magnetic conversion devices, and then the air lubrication floating surface 1F with respect to the magnetic recording medium shown in FIG. 10 is finished into a precise and uniform dimension by polishing, etc., between the blocks and inside each block. (By the way, each pair of thin film magnetic conversion devices 9 shown in FIG. 3 are cut and one slider shown in FIG. 10 is constituted.) However, the dimension of this gap depth cannot be inspected directly during machining as described above and its absolute value is ultra-small. Accordingly, it has been extremely difficult to precisely and uniformly control it between the blocks and inside each block.

To solve the problems described above, JP-A-63-29315 proposes a method which disposes a plurality of signal detection circuits for detecting the point at which a gap depth reaches a predetermined gap depth dimension, and precisely controls the absolute value of the gap depth dimension. Further, the Applicant of this invention proposes a method in JP-A-3-27008 (Japanese Patent Application No. 2-68268) which always monitors a gap depth dimension of a plurality of thin film magnetic heads inside a given block by the application of the signal detection circuits described above and stops machining at the point at which the distribution of the dimension inside the block is in the best conformity with dimensional tolerance.

However, variance of the substrates 1 (FIG. 3) as a production unit in pre-stages for forming a magnetic head structure on the substrate and various production variances occurring inside the plane of the substrate are also closely associated with the gap depth and affect performance of the thin film magnetic head.

As between the recording and reproduction performance of the thin film magnetic head, it is the recording characteristics of magnetic signals to a magnetic recording medium that is affected particularly greatly by the gap depth. Besides the gap depth, the shape constituting the magnetic head structure such as a thickness of a magnetic film of a magnetic core, and various other factors also affect the recording characteristics. To eventually obtain predetermined performance required for the magnetic head, it is necessary to distribute tolerance in accordance with all of these variance factors, to allot tolerance to each factor item and to fabricate the head within the tolerance of each factor.

Since the dimension of the gap depth has been determined in consideration of all the variance factors as described above, considerably fine standardized rating values of tolerance have been set to the gap depth. When the gap depth is examined in the unit of the individual thin film magnetic head, however, the required optimum center value of the dimension of the gap depth does not coincide in many cases with the standardized rating value depending on the machining conditions of the pre-fabrication stage. For this reason, there is a certain predetermined level limit to the yield in the aspect of signal recording performance of the head.

SUMMARY OF THE INVENTION

The present invention provides a method of producing an economical thin film magnetic head exhibiting required performance with a high production yield.

As described above, production variance at the time of formation of the thin film magnetic conversion devices is likely to occur in each substrate as the unit of formation of the conversion devices. The structure of the thin film magnetic conversion devices is obtained by depositing films of respective materials by vacuum deposition, plating, and recently, sputtering, by utilizing photolithography. Therefore, a certain predetermined tendency occurs in the thickness of the film formed depending on the formation method, though the tendency and the degree vary with each method, and directivity occurs in deposition of the film due to undulation of the surface of the base at the time of formation of the film, inside the plane of the substrate, too. Accordingly, production variance occurs in the structure of the magnetic conversion devices.

Generally, the fundamental electrical characteristics of the magnetic head are (1) an output $E_{LF}$ at a low frequency, (2) an output $E_{HF}$ at a high frequency, (3) resolution $E_{HF}/E_{LF}$ and (4) over-write. In connection with the characteristics associated with the magnetic gap depth, the magnetic gap depth is preferably great in order to improve the output $E_{HF}$ of the item (2) and resolution of the item (3), and is preferably small to improve over-write characteristics of the item (4). Accordingly, there is an optimum value of the magnetic gap depth to improve the characteristics (2), (3) and (4).

Generally, the thin magnetic heads 9 are regularly formed on the substrate 1 in a predetermined arrangement as shown in FIG. 3. FIG. 1 shows an example of dimensional tolerance of the gap depth at each pattern disposition position on this substrate. A region a in the drawing represents a gap depth tolerance design region of the standardized rating which is set in accordance with the tolerance distribution of all the factors associated with head performance, and symbol amed represents a center value of this tolerance. In contrast, when the optimum range of the gap depth is individually determined from the variance state of the pre-fabrication stage for the individual thin film magnetic heads, the optimum range tends to become the range represented by b in the drawing. Symbol bmed in the drawing represents the optimum center value.

Generally, the distribution of the dimension of the gap depth of the products statistically becomes approximate to the normal distribution having the center value of the tolerance as its center. As shown in FIG. 1, the standardized rating range tends to disagree with the individual optimum tolerance range at the substrate disposition position, near the first line, and at the end portion of the substrate in the proximity of the nth line. (The detail will be described later with reference to FIGS. 6 and 7.) Accordingly, the center of the distribution of the gap depth dimension when machining is made with the standardized rating tolerance greatly deviates from the center of the optimum range, and margin of head performance gets drastically deteriorated. There is the case where the optimum range becomes the range c in the drawing and in such a case, the probability is high that predetermined performance cannot be obtained even when machining is made to the gap depth dimension within predetermined tolerance. As a result, there occurs the problem that head performance, particularly, the yield of signal recording performance, cannot be improved.

However, it can be understood from FIG. 1 that the range of tolerance becomes greater than that of the standardized rating range, as the range of tolerance when the optimum value of the gap depth is individually determined for the individual thin film magnetic heads. In other words, when the individual head is examined, tolerance of the standardized rating is within the range which is by far narrower than actually necessary.

Therefore, the present invention solves the problems with the prior art in the following way. Namely, the thin film magnetic heads that have been rejected as non-conforming products according to the prior art, which effects machining of the magnetic gap depth of a predetermined dimension, can be converted to approved products by efficiently carrying out machining of an optimum gap depth for the individual thin film magnetic heads, and the thin film magnetic heads having excellent performance can be produced at a high production yield.

In a method of producing a thin film magnetic head involving a head element formation step (a lamination step of each thin film) as a pre-stage step and a magnetic gap depth machining step (an adjustment step of a magnetic gap depth) as a post-stage step, the method according to the present invention for accomplishing the object described above includes individually calculating and setting an optimum magnetic gap depth (for each head element or for each block of the head elements) in accordance with various production variances (variances of the shapes and dimensions of the head elements, etc.) occurring between the head elements, between blocks of a plurality of head elements and inside or between the substrates during the pre-stage step described above, and effecting machining of a magnetic gap depth to the magnetic gap depth, which is thus calculated and set and is different from head element to head element, during the post-stage step so as to correct the variances of characteristics occurring in the pre-stage step at the post-stage step and to eventually minimize the variance of characteristics of the individual magnetic heads finally obtained.

Accordingly, in the method of producing a thin film magnetic head including a device formation step (pre-stage step) of laminating a lower magnetic film, a magnetic gap, a conductor coil, an insulating layer for insulating the magnetic film from the conductor coil and a protective film on a substrate, and a magnetic gap depth machining step of machining and adjusting the magnetic gap depth (post-stage step), an apparatus for practicing the production method according to the present invention includes device formation data generation means for generating device formation data relating to the conversion devices laminated at the device formation stage, and magnetic gap depth calculation means for calculating a dimension providing an optimum value for each block including a plurality of heads (having substantially the same shape) produced in one head unit or in lot, or for each substrate, on the basis of the device formation data, and wherein the magnetic gap depth machining step is so carried out as to effect machining of an individual magnetic gap depth in accordance with the calculated value of the optimum value of the magnetic gap depth.

Here, the device information data is at least one factor selected from the group of factors including a film thickness of a flat portion of an upper magnetic film as a first factor, a film thickness of an upper magnetic film at its flat portion at a distal end of a magnetic gap as a second factor, and a relative distance, in a direction of the magnetic gap depth, between the position of a distal end of the insulating layer on the magnetic gap side and a position of a boundary at which the upper and lower magnetic films start expanding from a predetermined track width in the direction of the track width, and the magnetic gap depth calculation means is so constituted as to calculate the magnetic gap depth using either one, or at least two, of these factors in combination.

Further, the apparatus includes memory means for storing the magnetic gap depth calculated value in one head unit or one block unit or one substrate unit, means for transferring this magnetic gap depth calculated value to a magnetic gap depth machining unit of thin film magnetic heads corresponding to this one head unit or one block unit or one substrate unit, and a data management system by an electronic computer for collectively managing the device formation data generation means, the magnetic gap depth calculation means, the memory means and the transfer means and the machining steps ranging from the device formation step to the magnetic gap depth machining step.

The operation based on the construction described above will be explained.

In the present invention, the data relating to the shapes and dimensions of the conversion devices produced by the device formation step as the pre-stage step are obtained by the actual measurement by the device formation data generation means. In other words, various shapes and dimensions of the conversion devices are actually measured at the position at which the tendency of the change of the shape and the dimension inside each substrate at an intermediate point of the device formation step for each substrate can be correctly grasped, and the data are collected. The data include a film thickness (t1) of the upper magnetic film at its flat portion as a first factor, a film thickness (t2) of the upper magnetic film at its slope portion on the magnetic gap distal end side as a second factor, and a relative distance (Y), in a direction of the magnetic gap depth, between the position of the distal end of the insulating layer on the magnetic gap side and a position of a boundary at which the upper and lower magnetic films start expanding from a predetermined track width in the direction of the track width, as a third factor. As already described, these first to third factors are believed to greatly affect signal recording characteristics of the thin film magnetic head, besides the magnetic gap depth. Accordingly, these factors are hereby discussed.

Next, an optimum magnetic gap depth is calculated in a certain unit by the magnetic gap depth calculation means from the data relating to the shape and dimension described above. This unit can be a certain group unit of the magnetic conversion devices inside the substrate such as a block unit as a production unit of the machining step (when the first to third factors are substantially uniform inside the block). Generally, the smaller the thickness (t2) of the magnetic film at the slope portion, the weaker a recording magnetic field of the head becomes unless the gap depth dimension is reduced, so that it becomes difficult to obtain predetermined recording performance. Similarly, the gap depth dimension must be reduced when the relative distance (Y) between the distal end of the insulating film and the boundary of the magnetic distal end region becomes great. Accordingly, the optimum gap depth dimension is calculated from the thickness (t2) of the magnetic film at the slope portion of the individual thin film magnetic head and the relative distance (Y) between the distal end of the magnetic insulating film and the boundary of the pole distal end region in accordance with the relationship described above.

Next, at the magnetic gap depth machining step, the optimum gap depth dimension calculated in the manner described above is individually managed, and machining is carried out using this optimum gap depth dimension as the reference. Accordingly, those rejected products which are rejected because their performance is not sufficient, though they are machined to a predetermined gap depth, and those rejected products which, though providing sufficient performance, are rejected merely because the gap depth dimension is out of the tolerance according to the prior art, can be reduced, and the yield in both machining of the gap depth and performance can be improved. In this way, the heads having uniform characteristics can be mass-produced and the production cost of the thin film magnetic heads can be reduced.

To execute the present method in the actual production process, it is necessary to reliably and errorlessly transfer and transmit the individual data between each step associated with the device formation stage and each step associated with gap depth machining at the head slider machining step in the unit of the individual magnetic heads. To this end, an electronic computer for collectively managing the data throughout all the steps and a data base are provided, and a subsidiary electronic computer and a sub-data base for managing the data in the step unit and playing the role of a communication terminal with the main electronic computer are provided to each fabrication step. Furthermore, a data management system comprising communication equipment for connecting the main computer with the sub-computers is constituted so as to exchange the production data of the individual thin film magnetic heads. According to such a production system, the present invention can be executed more efficiently and more reliably.

As described above in detail, in the production method of the thin film magnetic head, the present invention generates the data relating to the shapes and dimensions of the conversion devices (variances) at the pre-stage steps by the actual measurement, calculates the optimum gap depth for the individual thin film magnetic heads on the basis of this data, and conducts gap depth machining of the individual thin film magnetic conversion devices in accordance with the optimum dimensions thus calculated. Accordingly, the present invention can produce thin film magnetic heads having excellent performance without being affected by product variance occurring in the individual thin film magnetic conversion devices at the device formation stage. Accordingly, the present invention can convert those products, which have been rejected conventionally as defective at the device formation stage because their shapes and dimensions are out of tolerance, by adjusting the magnetic gap depth to the optimum values. In other words, the production yield of the thin film magnetic heads can be improved; hence, the production cost can be reduced.

DETAILED DESCRIPTION

Hereinafter, preferred embodiments of the present invention will be described with reference to the accompanying drawings.

Figure 2:
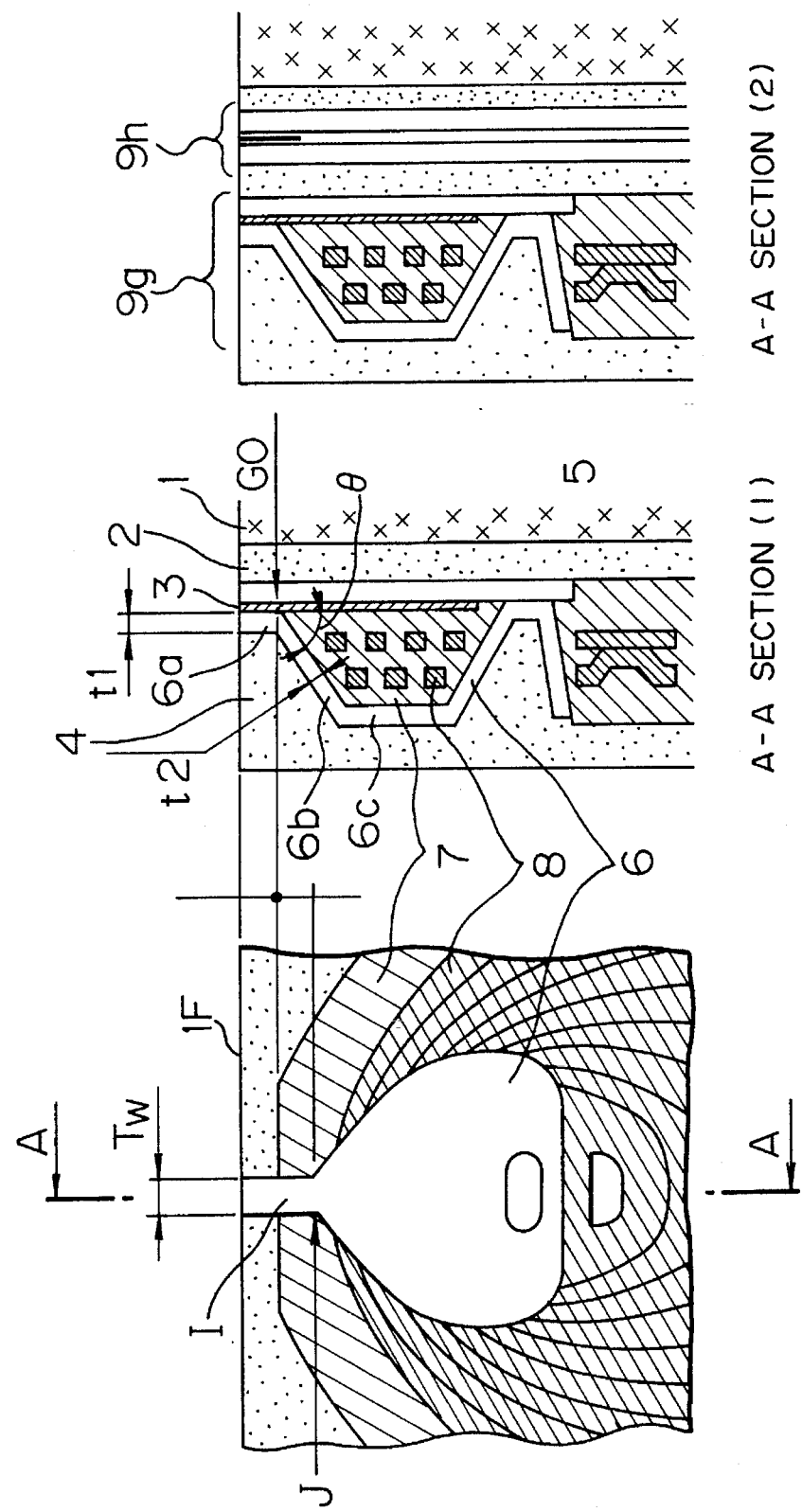
FIG. 2A is a sectional view showing an example of a structure of a magnetic conversion device portion of a thin film magnetic head.
FIG. 2B is a sectional view of FIG. 2A when an induction type thin film magnetic head is used.
FIG. 2C is a sectional view of FIG. 2A when a composite type thin film magnetic head is used.
Figure 4:
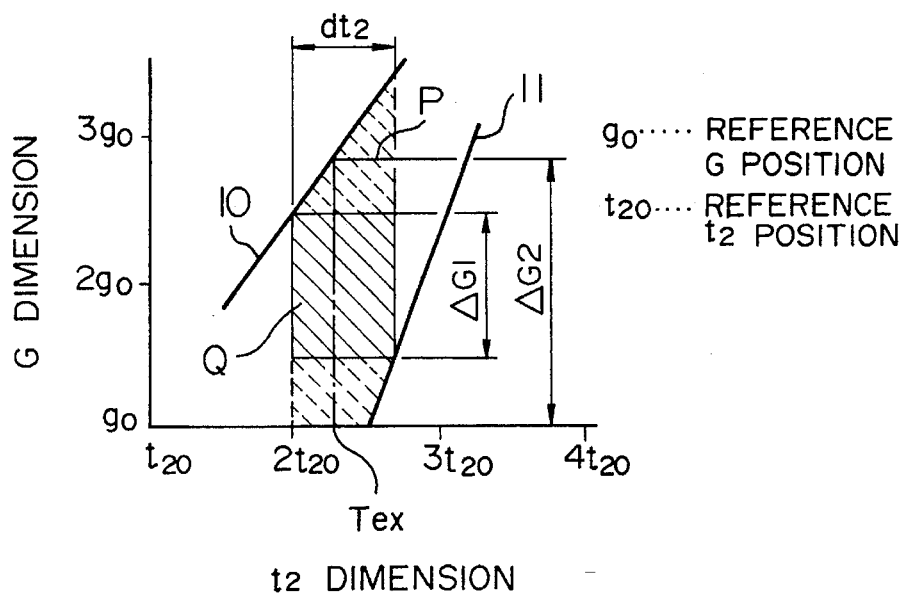
FIG. 4 is a diagram showing an example of the relationship between the thickness of a magnetic film at a slope portion and a tolerance range of a gap depth.

FIG. 4 is a diagram showing an example of the relationship between the thickness t2 of a magnetic film of a slope portion 6a of an upper magnetic layer 6 and a suitable gap depth for obtaining predetermined (required) signal recording performance in the thin film magnetic head shown in FIG. 2. A boundary 10 represents the upper limit of a gap depth. When the gap depth exceeds this upper limit, a recording magnetic field becomes weak and predetermined signal recording performance cannot be obtained. A boundary 11 similarly represents the lower limit. When the gap depth is smaller than this lower limit, a reproduction output of a recording signal attains a peak at a relatively low recording current when the recording current is increased, and becomes weak when a greater recording current (such as a recording current of a stipulated value, for example) is caused to flow. When tolerance of the thickness t2 of the magnetic film is within the range of dt2 shown in the diagram, it has been necessary according to the design method of the prior art to indiscriminately set the upper and lower limits of the gap depth so that the gap depth falls within the region Q indicated by an oblique solid line, in order to obtain predetermined signal recording performance whichever value within the tolerance dt2 the thickness t2 may assume. However, when the thin film magnetic head is taken into consideration in the original individual head unit, the gap depth range of the region P indicated by a dotted oblique line in the diagram is allowable. For instance, when the value of the thickness t2 of the magnetic film is known in advance as a value Tex, the tolerance of the gap depth is permissible within a broader range of ΔG2 which is broader by about 1.5 times than the conventional range of ΔG1. Accordingly, it can be understood that even those thin film magnetic heads which are rejected because they are out of the conventional tolerance range of ΔG1 are approved, because sufficient performance can be obtained so long as they are within the tolerance range of ΔG2.

Figure 5:
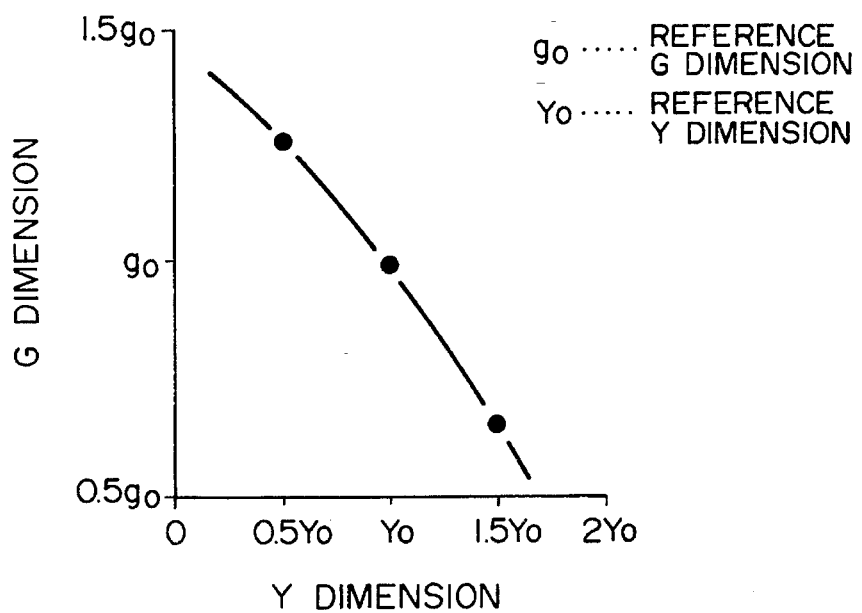
FIG. 5 is a diagram showing an example of the relationship between a dimension of a pole distal end region and a gap depth correction quantity.

FIG. 5 shows the relationship between the dimension of the magnetic tip region, i.e., its boundary (constricted part), the tip position g0 of the insulating layer and the distance Y, and a tolerance center reference value necessary for obtaining a predetermined recording magnetic field intensity. It can be understood from this diagram that predetermined performance cannot be obtained from those heads which have a great distance Y between the boundary J of the pole tip region and the tip position G0 of the insulating layer unless the gap depth is corrected to a smaller value.

Figure 3:
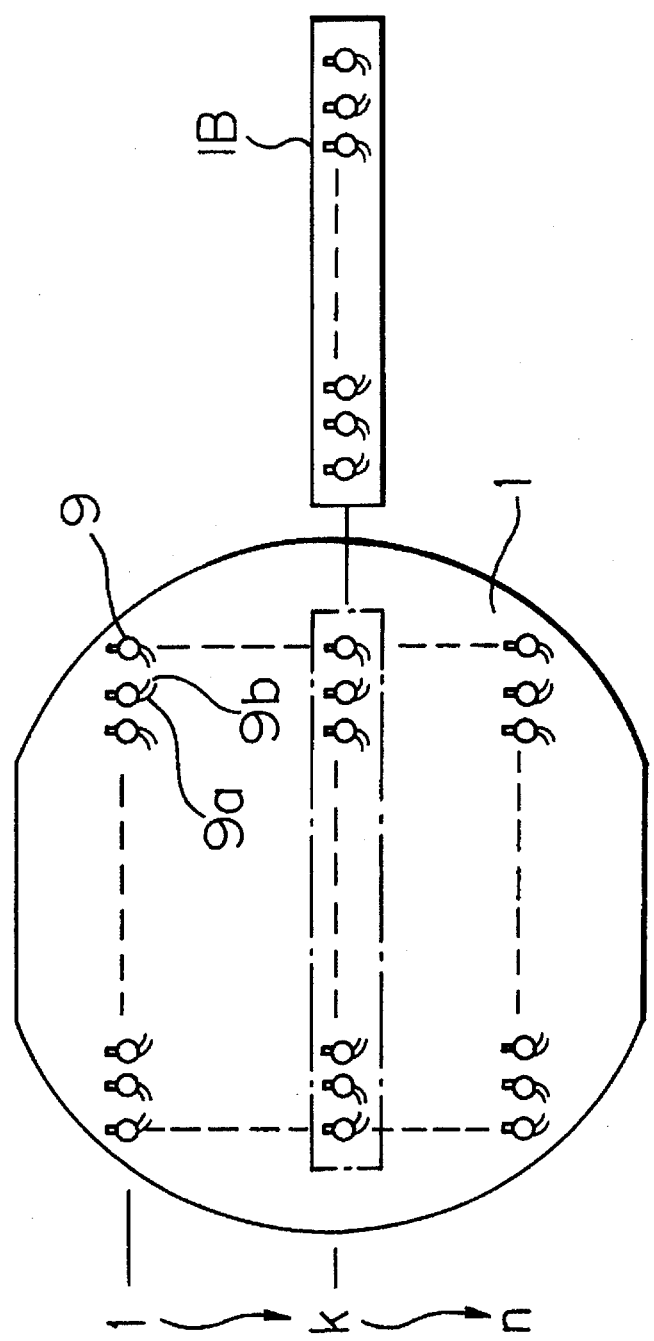
FIG. 3 is a schematic view showing an example of pattern disposition positions of thin film magnetic heads on a substrate.
Figure 6:
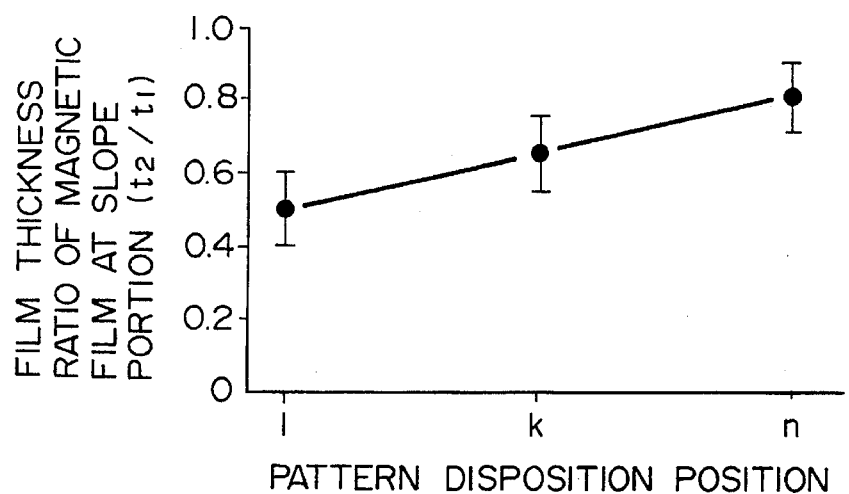
FIG. 6 is a diagram showing the change of the thickness of a magnetic film at a slope portion at the pattern disposition position on the substrate.
Figure 7:
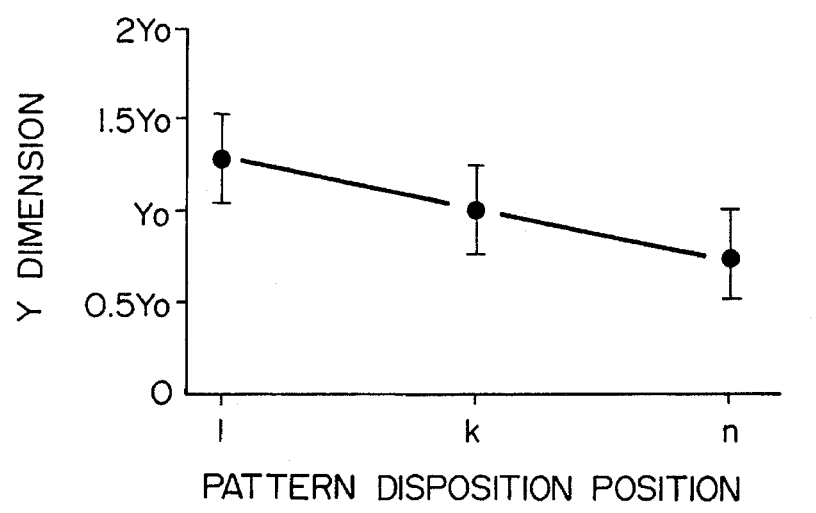
FIG. 7 is a diagram showing the change of the dimension of the pole distal end region at the pattern disposition position on the substrate.

FIG. 6 shows an example of the relationship between the tendency of the thickness t2 of the magnetic film of the slope portion 6b and the direction of disposition of each thin film magnetic head (the direction 1→n in FIG. 3) on the substrate 1 shown in FIG. 3, and FIG. 7 shows an example of the relationship between the tendency of the distance Y between the boundary of the pole tip region and the tip position of the insulating layer, and the direction of the disposition of the head.

FIG. 6 shows the ratio of the thickness t2 of the magnetic film of the slope portion 6b of the upper magnetic layer 6 formed by sputtering, which is plotted on the ordinate, to the thickness t1 of the magnetic film at the flat portion of the pole tip portion 6a (which is equal to the thickness of the flat portion 6c of the upper magnetic layer of the conductor coil 8). When the magnetic film is formed by sputtering, the thickness t2 of the magnetic field of such a slope portion tends to becomes smaller than the film thickness t1 at the flat portion when sputter particles are irradiated from above at the center of the substrate 1. The tendency shown in FIG. 6 occurs because the direction of the slope 6b of the slope portion is much more shaded than the flat portion with respect to the irradiating direction of the sputter particles, and the tendency becomes particularly remarkable on the first line side in the direction of disposition in FIG. 3 (because the slope 6b exists on the front side with respect to the irradiating direction on the nth line side).

FIG. 7 similarly shows the tendency of the distance Y between the boundary J of the pole tip region and the tip position G0 of the insulating layer with respect to the pattern disposition direction. This, too, shows a predetermined tendency with respect to the direction of disposition and becomes greater on the first line side, for the following reason. When a photoresist for patterning the upper magnetic film into the shape of a magnetic yoke is coated by spin coating (with the center of rotation thereof being set to the center of the substrate 1), the slope portion 6b of the insulating layer 7 on the magnetic gap side shown in FIGS. 2A to 2C (on the side of the surface 1F opposing the recording medium) faces the outer peripheral side of the substrate on the first line side. Therefore, the centrifugal force so functions as to wash off the photoresist film from the slope portion, so that the thickness of the photo-resist becomes smaller. Since patterning of the upper magnetic film is effected under this state, the removal operation of patterning tends to be excessive at the portion where the thickness of the photo-resist film is small, and tends to be much more reduced than the shape of the photo-mask using the shape of the patterned magnetic film being the reference. (In other words, the position of the boundary J is likely to deviate downward in FIG. 2. Since the slope portion 6b faces the inner peripheral side of the substrate on the nth line side, the opposite tendency is likely to occur.)

Figure 1:
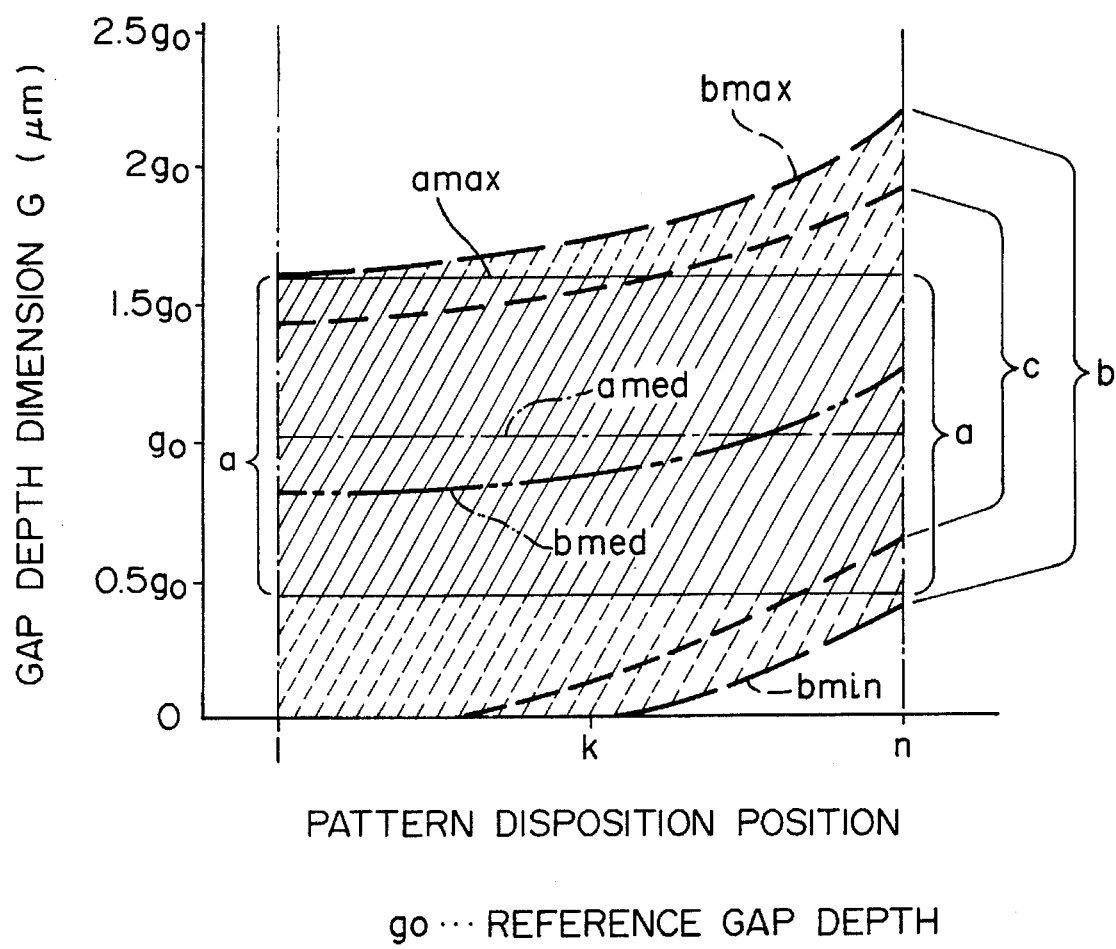
FIG. 1 is a diagram showing an example of the relationship between a disposition position of a thin film magnetic head pattern inside a substrate and an optimum tolerance range of a gap depth.

The region b (and the region c) shown in FIG. 1 represents an example of the tolerance of the optimal gap depth for the line unit of the position of disposition (each block 1B unit in FIG. 3) from the tendency of each dimensional value of the thickness t2 of the magnetic film at the slope portion and the distance Y between the pole tip region and the tip position of the insulating layer occurring in such a pattern disposition position, using the relationship shown in FIGS. 4 and 5. It can be seen from this diagram that when the tolerance of the gap depth is examined in the unit of the individual disposition position, the center value bmed of the tolerance and the upper and lower limits bmax, bmin tend to become smaller than the standardized tolerance a of the prior art on the first line side and tend to become greater on the nth line side. The width of this tolerance can be made greater than the standardized rating value of the prior art. Accordingly, when machining of the gap depth is carried out in match with the range represented by this b region in the unit of each disposition position or in other words, in the unit of the machining block 1B, the tolerance permitted to the gap depth becomes broader than in the prior art, and provides a more advantageous result in the aspect of the production yield. Machining is carried out while the machining target of the gap depth in each block is set to the center value bmed of the region b in the drawing which is optimal from head characteristics of that block. Therefore, in comparison with the case where machining is carried out while the tolerance center value amed is used as the machining target according to the prior art, margin of machining of the gap depth becomes greater in those blocks in which the difference between bmed and amed is great.

As described above, this embodiment represents the example where the thickness t2 of the magnetic film at the slope portion and the distance Y between the boundary of the pole tip region and the tip position of the insulating layer are used as means for calculating the optimal gap depth. However, the present invention can be practised by using either one of them, or by adding other device formation data. Other factors that affect recording/reproduction characteristics and are associated with the calculation of the gap depth include a magnetic gap length, a taper $\theta$ (the angle described between the slope portion 6b of the upper magnetic film 6 and the flat portion of the pole tip 6a in FIGS. 2B and 2C), the thickness of the lower magnetic film, the constriction quantity of the expansion portion of the magnetic film (the scrape-out quantity of the constricted part J in FIGS. 2A to 2C) and magnetic characteristics of the magnetic films 5, 6.

Although this embodiment represents mainly the example of the induction type thin film magnetic head for both recording and reproduction, the present invention can likewise be applied to a composite type thin film magnetic head of the type wherein a magneto-resistance effect type head is added for exclusive reproduction use besides the induction type head for recording only.

Next, an embodiment wherein the present invention is actually practiced in a practical production process will be explained.

According to this system, it is necessary to manage history information of the products in the unit of machining of the individual gap depths such as the unit of the machining block 1B shown in FIG. 3, as already described. An example of the production system for carrying out reliably and efficiently in a mass production line is shown in FIGS. 8 and 9.

Figure 8:
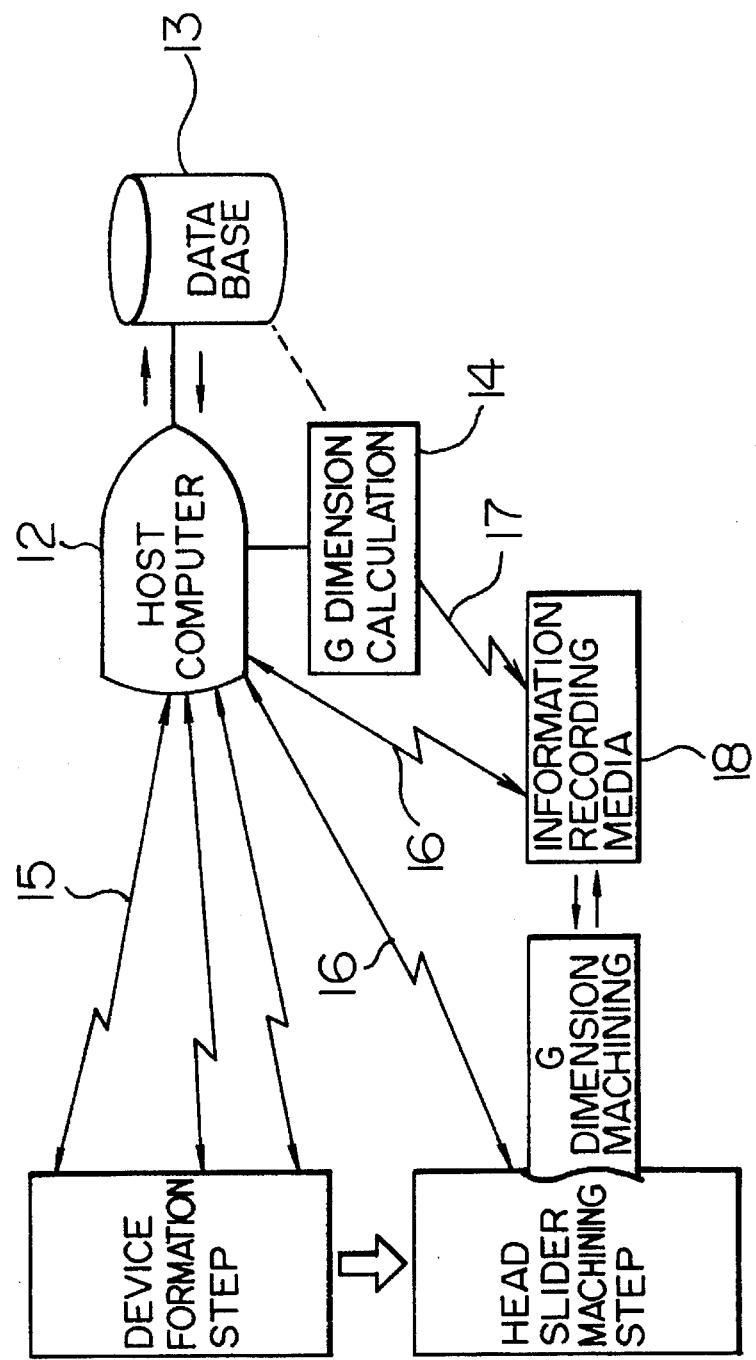
FIG. 8 is a block diagram showing an example of a data management system in a thin film magnetic head production process.

FIG. 8 shows an example of an overall data management production system ranging from a device formation step to a head slider machining step. Data such as the thickness t2 of the magnetic film at the slope portion, the distance Y between the boundary J of the pole tip region and the tip position G0 of the insulating layer, etc., at the device formation step are transferred to a host computer 12 collectively managing all the production data from each production step through communication lines 15. These data are divided in the substrate unit and are stored in a data memory data base 13 of the host computer 12. When each substrate is charged into the machining step, the device formation step data of this substrate is retrieved from the host data base 13, is divided into the unit of the individual thin film magnetic head at a gap depth G dimension calculation portion 14 in accordance with the method already described, and is written into information information recording medium (recording/reproduction apparatus and recording medium) 18 such as a floppy disk, an IC card, a compact disk, etc., in the unit corresponding to a lot assortment at the machining step. Calculation of this dimension G may be effected by the host computer 12. Data transfer to the machining step can be directly made using the communication cables 16 without using the data transmission medium 18. In connection with the gap depth calculation portion 14, too, the data of the device formation step may be transferred as such to the machining step while the calculation portion may be provided to the machining step side. In this way, the gap depth data of the individual thin film magnetic head is transferred to the gap depth machining step.

Figure 9:
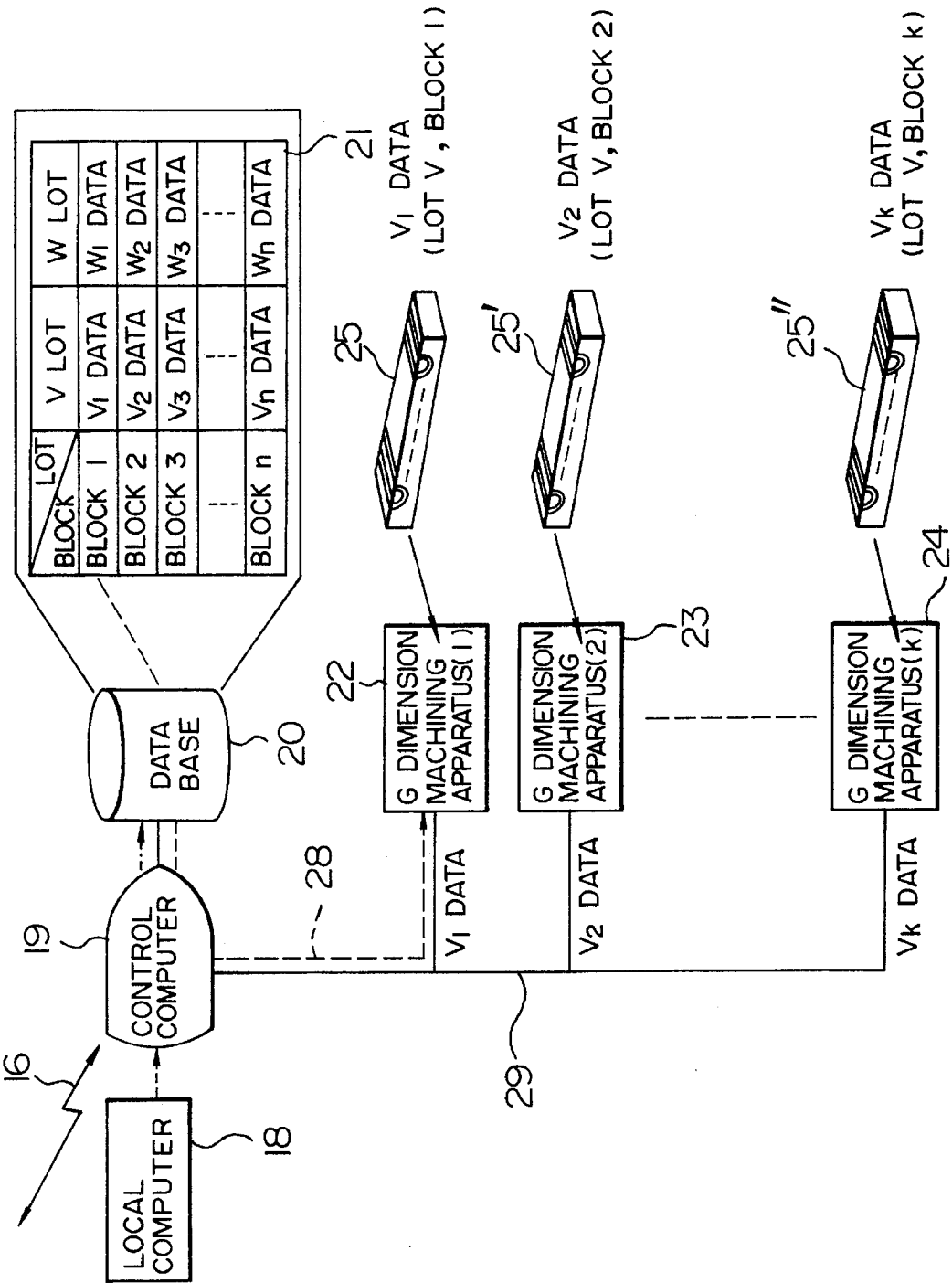
FIG. 9 is a block diagram showing an example of a data management system in a gap depth machining process.
Figure 10:
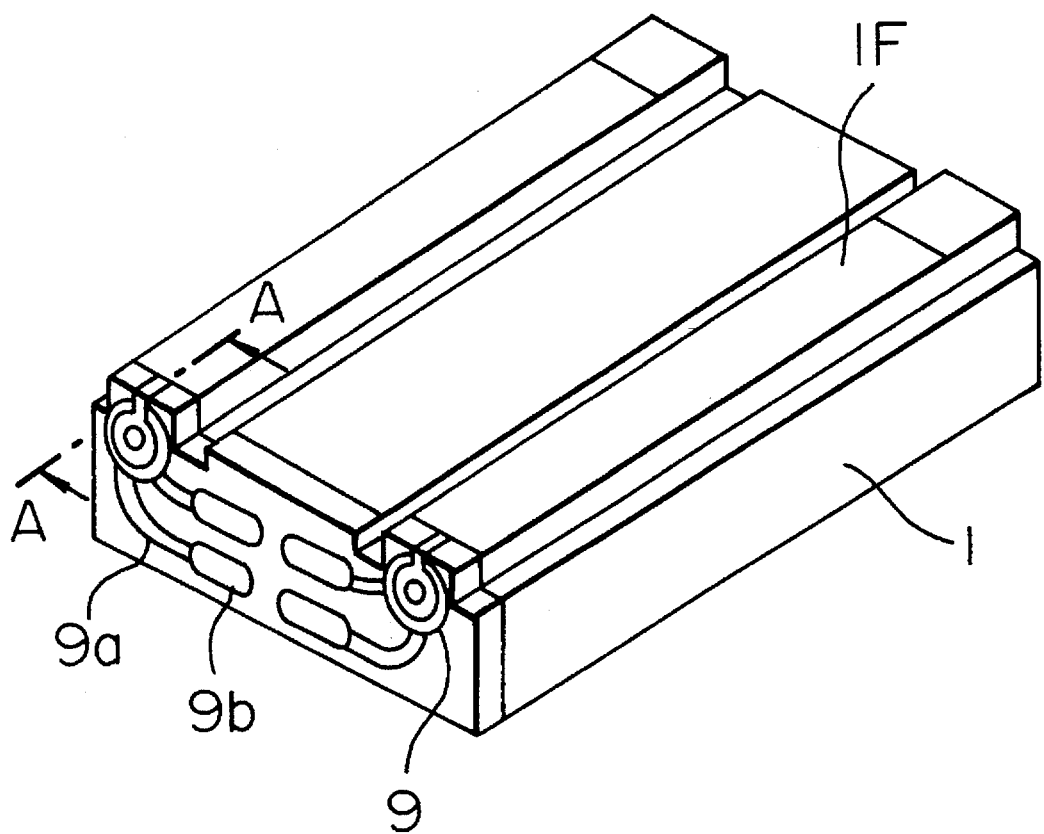
FIG. 10 shows an example of appearance of a completed thin film magnetic head slider.

FIG. 9 shows in detail an example of the data management system at the gap depth machining step shown in FIG. 8. The data recording medium 18 recording therein the gap depth data, etc., as described above moves inside the production steps together with the products assorted into the production lot by the machining steps. When each lot is charged into the gap depth machining step, the data of the data recording medium 18 is transferred to the data management computer 19 of the gap depth machining step and is stored in its data base 20. This data is put in order in the assorted form in the unit of the machining lot for each block, as represented by reference numeral 21 in the drawing. The gap depth machining apparatuses 22 to 24 are connected in advance to the data management computer 19 through communication lines 29, etc. When the product is machined, each gap depth machining apparatus makes an inquiry to the data management computer 19 about the data of the block through the communication lines 29 using a product identification symbol of the machining block as a keyword. Receiving this inquiry, the data management computer 19 retrieves the data base 20, selects the data of this block, and transfers the gap depth dimension data to the machining apparatus through the communication line 29.

More definitely, when the block 25 is machined by the machining apparatus 22, for example, the product identification number of this block is inputted to the machining apparatus 22 to ask the data. Receiving this instruction, the data management computer 19 retrieves the data of the VI block among the data 21 inside the data base 20 and transfers it to the machining apparatus 22 through the route represented by reference numeral 28 in the drawing. The machining apparatus 22 effects machining of the gap depth dimension on the basis of the gap depth data of the VI block in this data. Any of known machining methods may be employed for this machining. According to the method of the aforementioned reference JP-A-2-68268, for example, the absolute values of the gap depth inside the block under machining and the distribution of dimensions are monitored by signals from a signal detection circuit which detects the gap depth on the block. It is possible to employ a method which makes stop control by a data operation controller mounted to the machining apparatus on the basis of the data so as to stop machining at the point when the V1 block gap depth is in the best conformity with the optimum tolerance data.

According to the embodiment described above, the thin film magnetic heads having excellent performance can be produced without being affected by variance of production occurring in the individual thin film magnetic heads at the device formation stage. In machining of the gap depth, the tolerance for the machining dimension of each head can be expanded to about 1.2 to about 1.5 times that of the prior art method. As a result, the production defect regarding the gap depth can be reduced to about 50% of that of the prior art method and the defect of signal recording performance of the thin film magnetic heads can be reduced to about 30% of that of the prior art method. In this way, the present invention can improve the production yield of the thin film magnetic heads, and can reduce the production cost.

Though the embodiment has been explained about the induction type thin film magnetic head for both recording and reproduction, the present invention can also be applied to a composite type thin film magnetic head comprising the induction type thin film magnetic head in combination with the magnetoresistance effect type head for reproduction only.

What is claimed is:

1. A method of producing thin film magnetic heads comprising the steps of:

forming a plurality of magnetic conversion devices in respective lot units of one-block units by laminating a lower magnetic film, a magnetic gap layer, a conductor coil, an insulating layer for electrically insulating said conductor coil, an upper magnetic film and a protective film on a substrate;

collecting a plurality of data regarding formations of said magnetic conversion devices in said respective lot units and inputting said data into a memory device;

calculating each optimum value of a magnetic gap depth of said magnetic gap layer defining a distance between a position determining contact and separation of said gap layer with and from said upper magnetic layer and a surface of said thin film magnetic head opposing a magnetic recording medium, on a basis of said data in each of said respective lot units; and machining said magnetic gap depth of said magnetic gap layer to embody said optimum value on a basis of said optimum value and producing said thin film magnetic heads.

2. The method of producing thin film magnetic heads according to claim 1, wherein said data regarding formation is at least one factor selected from the group of factors including a film thickness of a flat portion of said upper magnetic film as a first factor, a film thickness of a slope portion at a distal end of the magnetic gap of said upper magnetic film as a second factor, and a relative distance between a position of a distal end of said insulating layer on the side of the magnetic gap and a boundary position at which said upper magnetic film and said lower magnetic film expand from a predetermined track width in a direction of a track width, in a direction of the magnetic gap depth, as a third factor.

3. A method of producing induction type thin film magnetic heads each having a substrate, a lower magnetic film above said substrate, a magnetic gap layer on said lower magnetic film, a conductor coil above said magnetic gap layer, an insulating layer on said magnetic gap layer for electrically insulating said conductor coil, an upper magnetic film on said magnetic gap layer, said insulating layer and said lower magnetic film, and a protective film on said upper magnetic film, comprising the steps of:

forming a plurality of magnetic conversion devices in respective lot units of one-block units by laminating a raw lower magnetic film, a raw magnetic gap layer, a raw conductor coil, a raw insulating layer for electrically insulating said conductor coil, a raw upper magnetic film and a raw protective film on a raw substrate;

collecting a plurality of data regarding formations of said magnetic conversion devices in said respective lot units, and inputting said data into a memory device;

calculating each optimum value of magnetic gap depth of said magnetic gap layer defining a distance between a position determining contact and separation of said gap layer with and from said upper magnetic layer and a surface of said thin film magnetic head opposing a magnetic recording medium, on a basis of said data in each of said respective lot units; and machining said magnetic gap depth of said raw magnetic gap layer to embody said optimum value on a basis of said optimum value, to produce said induction thin film magnetic heads from said magnetic conversion devices.

4. The method of producing thin film magnetic heads according to claim 1, wherein said thin film magnetic heads are composite magnetic heads with respective induction magnetic heads and respective magneto-resistive effect (MR) magnetic heads; and in said step of machining, magnetic gap depths of composite thin film magnetic heads are machined simultaneously with magnetic gap depths of induction thin film magnetic heads.

5. The method of producing induction thin film magnetic heads according to claim 3, wherein said data in said collecting step includes an information that a thickness ratio of a sloped portion of said upper magnetic film to a flat portion of said upper magnetic film increases or decreases according to directions of an arrangement of said magnetic conversion devices on said substrate.

6. The method of producing induction thin film magnetic heads according to claim 3.

wherein said data in said collecting step includes an information that a distance between a boundary of a pole tip region and tip position of said insulating layer decreases or increases according to directions of an arrangement of said magnetic conversion devices on said substrate.

* * * * *

UNITED STATES PATENT AND TRADEMARK OFFICE
CERTIFICATE OF CORRECTION

PATENT NO. : 5,483,734

DATED : 16 January 1996

INVENTOR(S) : Yukihiro ISONO et al.

It is certified that error appears in the above-identified patent and that said Letters Patent is hereby corrected as shown below:

On the title page, item [54] and col 1, line 2
In the Title, after "PRODUCING" insert --A--.

| Column | Line | |
|---|---|---|
| 1 | 1 | After "PRODUCING" insert --A--. |
| 2 | 48 | Change "is" to --are--. |
| 3 | 64 | After "particularly" delete ",". |
| 5 | 41 | Change "hereby" to --hereinafter--. |
| 9 | 55 | After "out" insert --the present invention--. |
| 10 | 7 | Delete "information" (second occurrence). |

UNITED STATES PATENT AND TRADEMARK OFFICE
CERTIFICATE OF CORRECTION

PATENT NO. : 5,483,734
DATED : 16 January 1996
INVENTOR(S) : Yukihiro ISONO et al.

It is certified that error appears in the above-identified patent and that said Letters Patent is hereby corrected as shown below:

| Column | Line | |
|---|---|---|
| 10 | 14 | Change "data transmission" to --information recording--. |
| 11 | 12 | Change "about" to --with reference to--. |
| 11 | 56 | Delete "type". |

Signed and Sealed this

Second Day of July, 1996

Attest:

*Attesting Officer*

BRUCE LEHMAN

*Commissioner of Patents and Trademarks*